May 14, 1963 E. A. ROGERS ET AL 3,089,339
TEMPERATURE SENSITIVE DEVICES

Filed April 25, 1960

INVENTORS
EDWARD A. ROGERS
NEILL G. BENNETT.

BY Mason, Mason & Albright

ATTORNEYS

United States Patent Office 3,089,339
Patented May 14, 1963

3,089,339
TEMPERATURE SENSITIVE DEVICES
Edward A. Rogers, London, and Neill Gibson Bennett, Egham, Staines, England, assignors to Graviner Manufacturing Company Limited, London, England, a British company
Filed Apr. 25, 1960, Ser. No. 24,514
Claims priority, application Great Britain May 1, 1959
3 Claims. (Cl. 73—362)

This invention relates to temperature sensitive devices for temperature detection and to methods of manufacture thereof.

More particularly, the invention relates to temperature detectors of the kind in which two spaced electrical conductors have the space between them containing a temperature sensitive material whose electrical resistance falls with rising temperature.

The detector may have a protective sheath in which the two conductors are contained or the sheath may be electrically conductive and may itself form one of the conductors with the other conductor located coaxially within it.

It is an object of the present invention to provide a novel temperature detector of the above kind which possesses advantages over known types of temperature detectors.

It is a further object of the present invention to provide a temperature detector of the above kind which is relatively simple to manufacture.

It is another object of the present invention to provide a temperature detector which can provide indications or warnings at two or more different temperatures.

It is yet a further object of the invention to provide a temperature detector of elongated form which will give a warning when a small length of the detector is exposed to a predetermined temperature and will also give a warning when a considerable length of the detector is exposed to a temperature different from said predetermined temperature.

The novel features of the present invention will be readily apparent from the following description of various forms of temperature detector in accordance with the invention, which will be described by way of example only, reference being made to the accompanying drawing, in which.

Figure 1:
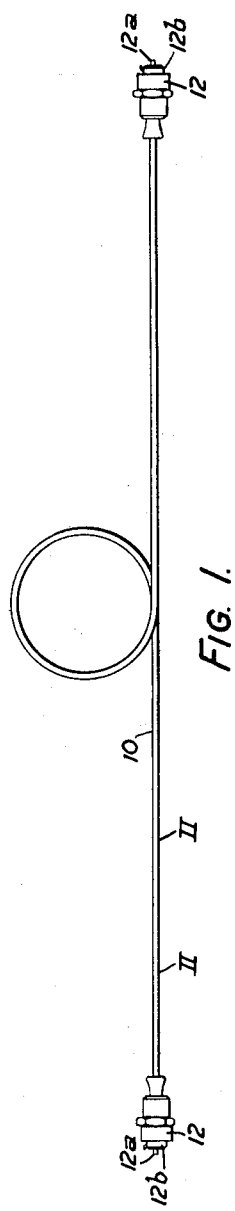
FIGURE 1 is a side elevation of a complete temperature detector.
Figure 2:
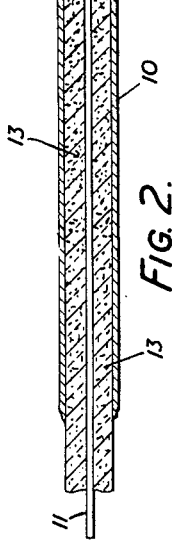
FIGURE 2 is a sectional view of a portion of the detector taken between the two points indicated by II, II in FIGURE 1 and on a larger scale than FIGURE 1.

The temperature detector shown in the drawings comprises an elongated metal sheath 10 of circular cross-section which, as shown in FIGURE 2, contains an inner coaxial conductor 11. The detector is shown looped at its mid-portion which is indicative of its flexibility. At each end, the coaxial inner and outer conductors 11, 10 are connected respectively to the centre pin 12a and outer sleeve 12b of coaxial electrical plugs 12.

The space between the inner conductor 11 and the outer sheath 10 is filled with a mixture 13 of glass with a chemical salt. The glass may be powdered or may be re-fused following its mixing with the salt.

Glass has an electrical resistivity which falls in a uniform manner with rising temperature, whilst chemical salts have an electrical conductivity which exhibits an abrupt change at a predetermined temperature dependent upon the crystal structure of the particular salt. Thus, if a source of electrical potential is connected across the conductors 10, 11 via one or both of the plugs 12, the current which flows through the circuit will be dependent upon the electrical conductivity of the mixture 13 and hence will be dependent upon the temperature to which the detector is exposed. The presence of glass in the composition 13 means that with increasing temperature there will be a gradual increase in the conductivity of the composition 13 such that, at a predetermined temperature, the current flowing in the circuit can be used to operate an appropriate indicating or warning device, for example by energization of an electromagnetic relay. However, at another temperature dependent upon the particular salt present in the composition 13, there will be an abrupt increase in the conductivity of the composition 13 and the resultant sharp increase in current can be used to give a further indication or warning, for example by energization of a second electromagnetic relay which requires a different operating current. This sudden increase in conductivity will be such that the increase in current flow will be virtually independent of the length of the device which is exposed to the temperature in question, that is to say the indication or warning will be given at a discrete temperature which is substantially independent of the length heated. On the contrary, the aforementioned change in conductivity of the glass is so much less that the current flowing between the conductors 10, 11 at a given temperature is dependent upon the length of the detector which is exposed to the temperature in question, in other words there will be an averaging effect. This averaging effect means that a predetermined current flow due to conductivity of the glass will not be solely dependent upon the temperature of the detector but will also depend upon the length of detector which is heated. Thus, if a short length of the detector is heated, the current flow resulting from conductivity of the glass will reach a predetermined value only when the temperature is substantially higher than if a longer length of detector is heated.

It is an important advantage of a detector in accordance with the present invention that an indication or warning can be given both when a discrete temperature is reached at any point along the detector and also as a result of the average temperature to which the detector is exposed. Thus, considering a specific example, the composition 13 may be such that when the whole length of a ten foot long temperature detector is exposed to a temperature of 230° centigrade, the conductivity of the glass is such that the resultant current flow operates an indicating or warning device connected in the circuit, whilst if only a short length of the detector is exposed to a higher temperature, say 300° C. then an indication or warning is also given due to the fact that at this temperature there is a sudden change in the conductivity of the salt as the result of which sufficient current flows to operate the indicating or warning device. It should be emphasized that at the lower temperature, viz. 230° C. the conductivity of the salt is insufficient to result in the necessary current flow which will only occur as a result of the increased conductivity of the glass when the entire length of the detector is exposed to this temperature.

On the other hand, even at the higher temperature viz. 300° C. the conductivity of the glass will not have risen sufficiently to give the necessary operating current when only a small length of the detector is heated. However, after the transition point in the conductivity of the salt is reached, its conductivity is so high that only a very short length of the detector need be heated to this temperature to allow the required operating current to flow.

An example of the application of detectors in accordance with the invention is in aircraft engines. The temperatures of operation will be determined by the normal maximum permissible ambient temperature in the engine bay. The detectors will then be designed so that if this ambient temperature is exceeded the detector will give an indication or warning as a result of the whole length or a substantial length of the detector having been exposed to a temperature above the maximum permissible ambient temperature. This will be due to the increase in conductivity of the glass. On the other hand, should there be a local overheat, for example due to a split combustion can in the case of a jet engine, which results in a local temperature considerably in excess of the normal ambient, an indication or warning will be given once again due to the conduction of the salt in the short length of detector which is exposed to this local high temperature. If desired, the indication or warning given in each circumstance may be a different one by providing separate current responsive means in the circuit, such as the two relays referred to above, so that it is apparent whether the ambient temperature as a whole has risen or whether there has been only a local rise in temperature.

Figure 3:
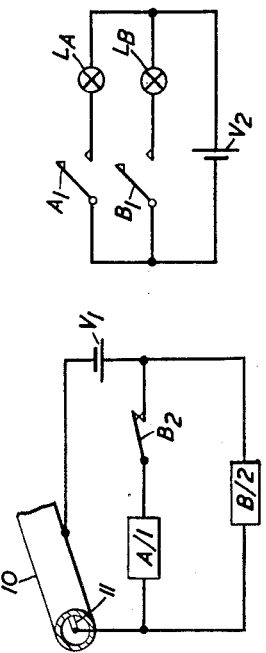
FIGURE 3 is a circuit diagram of one form of indicating circuit for use with the detector.

Such a circuit is shown in FIGURE 3 where two electromagnetic relays A/1 and B/2 are connected in parallel with one another and in series with a potential source $V_1$ across the sheath 10 and inner conductor 11. The relay B/2 requires a higher operating current than relay A/1. When a substantial length of the detector is heated the current flow due to conduction of the glass effects operation of relay A/1 and closes contacts A1 so that lamp $L_A$ is lit to provide the required indication due to current from potential source $V_2$. If a short length of the detector is exposed to the higher temperature the greater current which results from conduction of the salt causes operation of relay B/2 which closes contact B1 to light lamp $L_B$ and provide the alternative operation. Contact B2 is opened so that lamp $L_A$ is not lit. If illumination of only a single lamp is required irrespective of whether conduction is due to the glass or the salt only a single relay and lamp need be provided or a lamp may be illuminated directly from the current flowing between the conductors.

Whilst many compositions of glass may be used for this purpose, we have found that soda-lime glasses, such as those known as X8 or G25 and available from Messrs. Plowden and Thompson are particularly suitable, as also are borosilicate or aluminosilicate glasses. A large number of salts may be used, some examples of which are given below together with the transition temperature at which the phase change occurs which results in the sharp increase in conductivity of the salt.

| Salt | | Approximate transition point in degrees Centigrade |
|---|---|---|
| thallous iodide | TlI | 173 |
| thallium ticoate | $TlOC_6H_2(NO_2)_3$ | 46 |
| zinc sulphide | ZnS | 1,020 |
| cuprous bromide | CuBr | 384 |
| cuprous iodide | CuI | 401 |
| copper sulphide | $Cu_2S$ | 91 |
| silver bromate | $AgBrO_3$ | 98 |
| silver iodide | AgI | 145 |
| silver sulphide | $Ag_2S$ | 177 |
| silver sulphate | $Ag_2SO_4$ | 411 |
| silver selenide | $Ag_2Se$ | 133 |
| silver nitrate | $AgNO_3$ | 159 |
| manganese sulphate | $MnSO_4$ | 860 |
| ferrous sulphide | FeS | 298 |
| chromium chloride | $CrCl_2 4H_2O$ | 38 |
| aluminium bromide | $AlBr_3$ | 70 |
| barium chloride | $BaCl_2$ | 925 |
| barium carbonate | $BaCO_3$ | 806 |
| lithium sulphate | $Li_2SO_4$ | 576 |
| sodium sulphate | $Na_2SO_4$ | 236 |
| sodium hydrogen phosphate | $Na_2HPO_4 \cdot 12H_2O$ | 29 |
| sodium carbonate | $Na_2CO_3$ | 450 |
| potassium hydroxide | KOH | 248 |
| potassium chloride | KCl | 208 |
| sodium nitrate | $Na_2NO_3$ | 330 |
| potassium chlorate | $KClO_3$ | 255 |
| potassium sulphide | $K_2S$ | 146 |
| potassium sulphate | $K_2SO_4$ | 588 |
| potassium metaphosphate | $KPO_3$ | 450 |
| potassium pyrophosphate | $K_4P_2O_7$ | 278 |
| potassium carbonate | $K_2CO_3$ | 410 |
| lithium potassium sulphate | $LiKSO_4$ | 435 |
| potassium nitrate | $KNO_3$ | 335 |
| potassium tungstate | $KWO_4$ | 388 |
| calcium sulphate | $CaSO_4$ | 1,193 |
| mercuric iodide | $HgI_2$ | 127 |
| caesium chloride | CsCl | 451 |
| arsenous sulphide | $As_2S_2$ | 267 |
| arsenic sulphide | $As_2S_3$ | 170 |
| antimony chloride | $SbCl_3$ | 65 |
| lead sulphate | $PbSO_4$ | 854 |
| thallium nitrate | $TlNO_3$ | 75 |
| nickel sulphide | $Ni_3S_2$ | 550 |
| caesium sulphate | $Cs_2SO_4$ | 660 |
| caesium nitrate | $CsNO_3$ | 161 |

Many methods of manufacture of such a detector may be employed. Thus, the glass may be powdered and mixed with the salt in powder form or the glass may be coated with the fused salt. The mixture or the coated glass will then be tamped into the space between the inner and outer conductor, and if desired the outer conductor can subsequently be reduced in diameter by drawing through dies or by other suitable means in order to compress the filling.

Another method of manufacturing the detector is to employ the apparatus and method described in the specification accompanying pending patent application Serial No. 722,914 of Rupert Griffiths which is assigned to the same assignees as is the present application. Employing the method described and illustrated in this aforesaid pending patent specification the salt may be melted with the discrete particles 13 of refractory material in order to coat the particles of refractory material with salt. The refractory particles thus coated are then loaded into the hopper (29) and the salt-coated particles are embedded in the glass in the finished detector as indicated in FIGURE 2 of the drawings.

Yet another method of producing a temperature detector in accordance with the present invention is to use one or other of the methods described in the specification of U.S. Patent No. 2,731,532 which is assigned to the same assignees as is the present application. In the form of detector described in patent specification No. 2,731,532 ceramic heat resisting beads are incorporated in the detector. Thus, to manufacture a detector in accordance with the present invention, the ceramic beads (f) are first coated or impregnated with fused salt or salt solution and the coated or impregnated beads are then incorporated in the detector using one or other of the methods of manufacture described in patent specification No. 2,731,532. At first sight, it might seem surprising that the salt in the beads could result in conduction between the two conductors, but this is in fact rendered possible by the fact that such detectors are coiled for storage and transit and are also bent around a radius in use and such bending results in the glass filling surrounding the beads being broken into a very large number of washers or discs between which the salt can conduct.

The aforesaid method of manufacture may be modified by omitting the ceramic beads (*f*) and instead coating the glass tube lengths (*c*) with a solution of the salt, the ceramic beads being completely omitted.

The amount of salt required is extremely small. Thus, when powdered glass is coated with the salt only a very fine coating is required. In the event that salt is mixed with the powdered refractory particles in order to manufacture by the method described and illustrated in the patent specification of application Serial No. 722,146 the proportions of salt to refractory particles may be as little as 5:95. However, the proportion of salt to refractory particles may be very much greater although it is preferred not to exceed the proportions of 50:50 because above this ratio the resultant mixture does not flow so easily from the hopper (29) down the grid feed tube (30). It should be clearly understood that only sufficient salt is required to give adequate conductivity at any desired position along the length of the detector, or more normally at all positions along the length. On the other hand a relatively high proportion of salt may be provided without effecting the aforesaid modes of operation.

Although reference has been made specifically to the use of single salts it will be clear that eutectic salt mixtures may be employed which give a sharp change in conductivity at the eutectic point of the salt mixture.

We claim:

1. A temperature detector comprising two spaced electrical conductors and a normally electrically-insulating mass extending between said conductors, said mass being composed of glass and a chemical salt whereby said mass becomes electrically conductive at a first temperature dependent upon the gradual increase in conductivity of said glass with rising temperature and also becomes electrically conductive at a second temperature dependent upon the sudden increase in conductivity of said salt with rising temperature, a source of electrical potential, first current-responsive indication means, and second current-responsive indication means, said first and second current-responsive means being connected in electrical circuit with said source of electrical potential across said conductors, said first current-responsive indication means being operated by the current flowing at said first temperature due to the increased conductivity of said glass and said second current-responsive indication means being operated by the current flowing at said second temperature due to the sudden increase of conductivity of said salt.

2. A temperature detector comprising two elongated electrical conductors, said conductors being spaced apart, and a mass extending between said conductors, said mass being composed of glass with members of refractory material distributed along the length of the detector, said glass having an electrical resistance which is high at low temperatures but which falls gradually with increasing temperature, said refractory members being coated with a fusible chemical salt which when fused exhibits a high electrical conductivity.

3. An elongated temperature detector comprising an elongated electrically conductive sheath, and inner conductor located co-axially within said sheath, a mass filling the space between said inner conductor and said sheath, a source of electrical potential, first current-responsive indication means and second current-responsive indication means, said first and second current-responsive indication means being connected in electrical circuit with said source of electrical potential across said sheath and said inner conductor, said mass containing glass whose electrical conductivity rises with increasing temperature whereby when the whole length of the detector is heated to a first predetermined temperature the current flowing between the sheath and the inner conductor causes operation of said first current-responsive indication means, said mass further containing a chemical salt whose electrical conductivity increases sharply at a second predetermined temperature whereby when a short length of the detector is heated to said second predetermined temperature the current flowing between the sheath and the inner conductor causes operation of said second current-responsive indication means.

References Cited in the file of this patent

UNITED STATES PATENTS

| | | |
|---|---|---|
| 2,413,125 | Waldbridge | Dec. 24, 1946 |
| 2,677,172 | Oakley | May 4, 1954 |
| 2,740,874 | Kelly et al. | Apr. 3, 1956 |
| 2,836,692 | Griffiths | May 27, 1958 |
| 2,893,182 | Pies | July 2, 1959 |
| 2,949,594 | Tava et al. | Aug. 16, 1960 |
| 3,009,127 | Flanagan | Nov. 14, 1961 |